Dec. 27, 1927.
E. M. COLE
1,654,411
SEED CUP FOR PLANTERS
Filed May 1, 1926
4 Sheets-Sheet 1
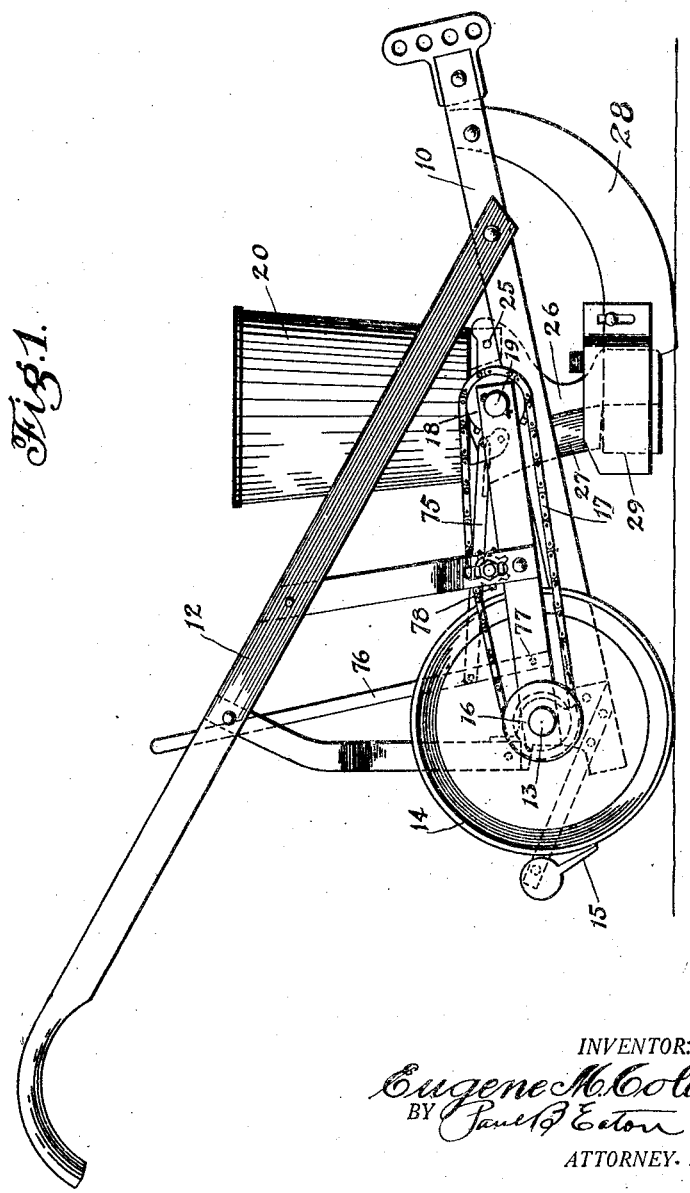
INVENTOR:
Eugene M. Cole.
BY Paul B. Eaton
ATTORNEY.

Dec. 27, 1927.
E. M. COLE
1,654,411
SEED CUP FOR PLANTERS
Filed May 1, 1926
4 Sheets-Sheet 2
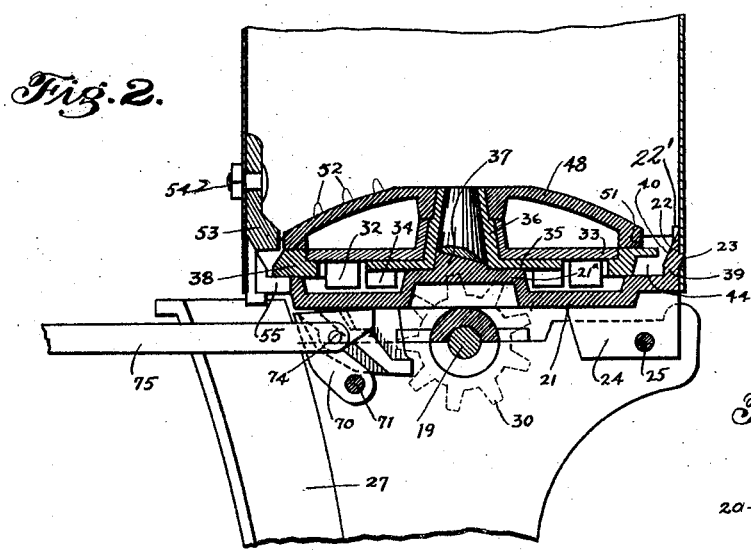
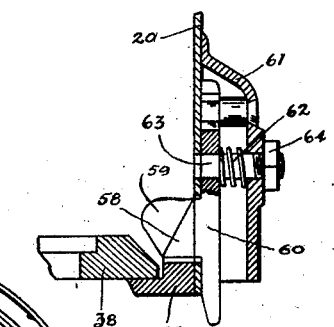
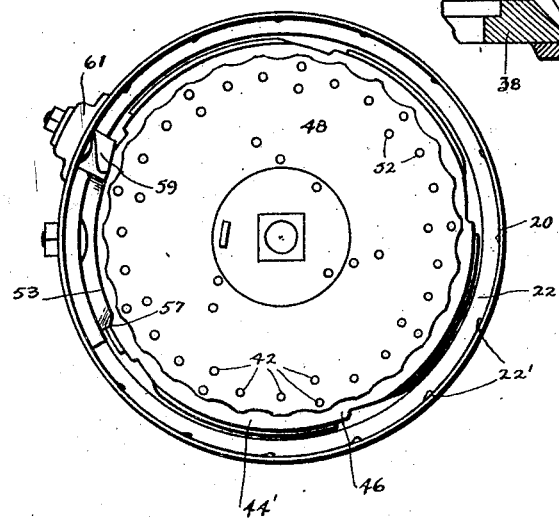
INVENTOR:
Eugene M. Cole
BY Paul H. Eaton
ATTORNEY.

Dec. 27, 1927.

E. M. COLE 1,654,411

SEED CUP FOR PLANTERS

Filed May 1, 1926

INVENTOR:
Eugene M. Cole
BY
ATTORNEY.

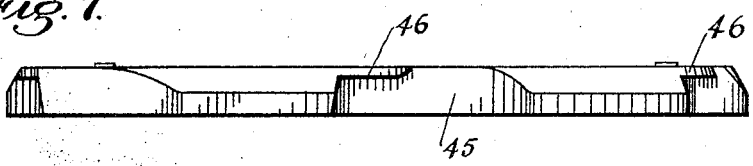
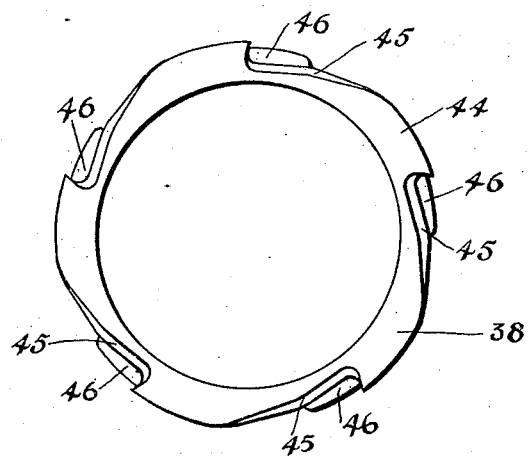
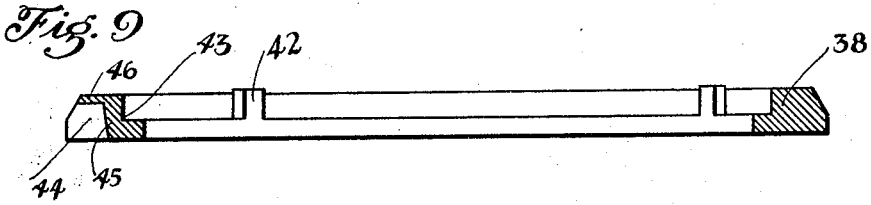

Patented Dec. 27, 1927.

1,654,411

UNITED STATES PATENT OFFICE.

EUGENE M. COLE, OF CHARLOTTE, NORTH CAROLINA.

SEED CUP FOR PLANTERS.

Application filed May 1, 1926. Serial No. 106,029.

This invention relates to seeders, and more especially to seeders adapted to plant a single row as it traverses a field.

One object of my invention is to provide a seed cup of special structure which is adapted to plant a predetermined volume of seed in each hill and to insure the dropping of the seed at regular intervals.

Another object of my invention is to provide a seed cup to be used in a planter such as that set forth in my prior Patent, Number 1,398,066, of November 22, 1921, which will insure the dropping of the seed at regular intervals.

Another object of my invention is to provide an improved seed cup which will separate the desired quantity of seed from the bulk contained in the hopper, and insure the dropping of said seed at regular intervals.

Another object of my invention is to provide an improved seed cup for planters which will tear the seed away from the bulk and push this separted portion of seed downwardly prior to the dropping operation.

Having thus stated some of the objects of my invention, a brief description of the drawings, showing a preferred embodiment of my invention, follows, in which—

Figure 1 is a side elevation of my complete planter in which my improved seed cup is adapted to be used;

Figure 2 is an enlarged vertical section, taken longitudinally of the planter, through the seed dropping mechanism and associated parts;

Figure 3 is a plan view of the hopper, showing the cap plate equipped with spurs;

Figure 4 is a detailed section on an enlarged scale, showing the wiping mechanism;

Figure 7 is a side elevation of the same;

Figure 8 is a bottom plan view of my seed ring, showing the improved seed cups.

Figure 9 is a cross-sectional view through the seed ring.

Figure 5:
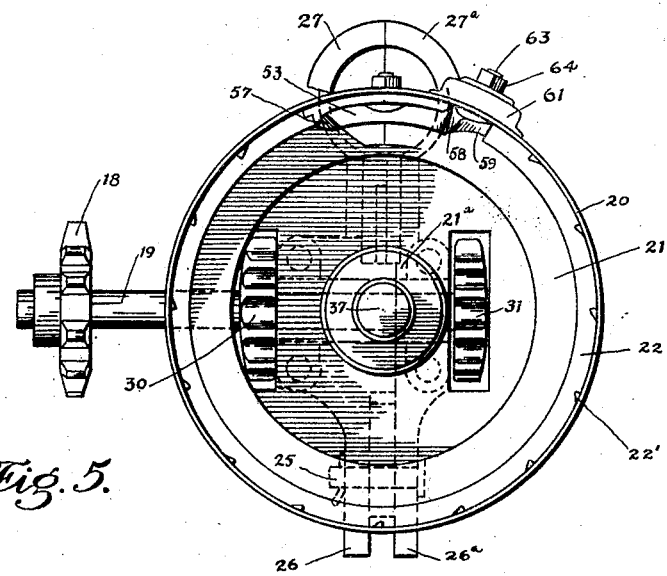
Figure 5 is a plan view of the hopper with the cap plate and seed ring removed, showing the driving mechanism.
Figure 6:
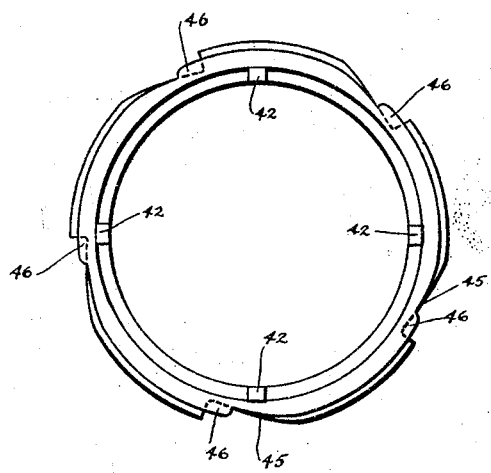
Figure 6 is a plan view of my seed ring, showing my improved seed cup.

Referring to the drawings in detail, my planter comprises the frame 10, the handles 12, the ground wheel 14 mounted on the spindle 13, and the scraper 5 for the wheel 4. A sprocket wheel 16 is rigidly secured to the shaft 13 and turns with the ground wheel. A sprocket chain 17 engages the wheel 13 and serves to drive a sprocket wheel 18, mounted on a shaft 19 and serving to operate the seed dropping mechanism hereinafter described.

An idler 78 for supporting the sprocket chain 17 intermediate its ends may be employed if desired. The parts so far described are of the usual structure.

The numeral 20 designates the seed hooper, which is preferably made of sheet metal and is cylindrical in form. It is secured at its lower edge to the bottom plate 21, which is provided with an upstanding flange 22 and an elevated central portion 21$^a$ on which the casting 36 rests. The preferred method of connecting the hopper 20 to the bottom plate is by means of slight projections 23 formed on the flange 22 which extend into corresponding openings in the hopper body.

Near one side of the bottom plate 21 there is secured the fin 24 which is pivotally mounted on the pin 25, so the hopper may be rocked on this pin. The pin 25 is mounted in and supported by the two halves 26 and 26$^a$ of a casting secured to the frame underneath the hopper and containing the seed chute or boot 27—27$^a$. The two halves of the casting are shaped to form a recess to receive the fin 24. A furrow opener or sword 28 extends in front of the casting 26 and is secured to the frame 10 in the usual manner, the wings or spreaders 29 being provided on either side of the seed chute.

The shaft 19 is journalled in bearings supported by the casting 26, and secured to this shaft beneath the hopper is a pair of gear wheels 30 and 31, spaced as shown in Figure 5. The wheels mesh respectively with annular series of teeth 32 and 34 (see Fig. 2). The teeth 34 project from the bottom of the casting 35, which is provided with a central hub 36, journalled upon a boss 37, projecting up from the bottom plate 11. The teeth 32 project downwardly from the lower face of a driving plate 33, the function of which is to drive the seed ring 38 as will now be described.

In the bottom plate 21 there is formed the annular runway having a flat bottom and a vertical outer wall 39. From the top of the wall 39 the flange 22 is shaped to form an upwardly and outwardly inclined surface 40, as is clearly shown in Figure 2.

The driving plate 33 has a plurality of notches in its periphery which fit over the projections 42 on the seed ring 38, thus forming a driving connection for the seed ring. The profile of the notches or cups in the seed ring is of special design. The inside of the ring is provided with the groove 43 to receive the plate 33, and on the outer periphery of the ring is formed a series of cups 44, all lying in the plane of the ring. As is clearly shown in Figures 7, 8 and 9, these cups are of special design having the radially inward projecting wall portions 45, said wall portions having a greater radial distance at their upper edges than at their lower edges, and covering these cups 44 and integral with the seed ring, are the portions 46. The covers 46 may be varied in size and extent, a preferred embodiment being shown in the drawings. The wall portions 45 of these seed cups slant radially inward for a portion of their length as they progress around the circumference of the seed ring at a slight angle to the radius of the seed ring and then the angularity of the slant becomes greater as the wall portions go under the covers 46, thus forming suitable spaces for the collection of the seeds, and which is entirely cut off from the bulk of the seed in the hopper as the front portion of the cover 46 approaches the wiping mechanism.

It is apparent from observing Figure 2 that a quantity of seed will collect in the V-shaped seed receiving channel, and these seed will press against the wall portions 45 and will enter the covered portion of the cups. In the case of cotton seed the seed often tend to cling together. The cover 46 will prevent this and will tear the seed in the cup away from the bulk, and the seed thus trapped under the cover 46 will be dropped into the seed receiving spout at the proper time, and the possibility of missing will be eliminated. The peculiar form of the wall portions 45, as shown best in Figures 2, 8 and 9 causes the seed entering the cups to be separated from the bulk of the seed in the hopper, and the thin covers 46 will complete this process of separation, and when the cup portion enters beneath the wiping mechanism there will be the desired amount of seed in the cup ready to be dropped. The peculiar form of the wall portions of these seed cups also allows the seed to easily drop therefrom into the chute.

Mounted concentrically and superposed upon the seed ring is a dome-shaped cap 48. This cap has a squared opening in its center which fits over the similarly shaped upper end of the hub 36, and therefore, turns therewith. The cap 48 is of slightly less diameter than the seed ring.

The upper surface of the cap 48 has a plurality of projections 52 thereon, which serve to agitate the bulk of seed contained in the hopper.

Referring again to Figure 2, it will be seen that the periphery of the cap 48 and the ring 38, together with the inclined wall 40 of the hopper bottom 21, form an annular seed receiving trough. The shape of the cap and its rotation serve to feed the seed into this annular trough, so that the proper filling of the pockets or cups is always assured.

In order to prevent the clogging of the seed or the delivery of too great a quantity of seed to the seed receiving chute, there is provided a wiping mechanism, which comprises the guard 53 secured to the inside of the hopper just above the discharge opening 55, by means of a bolt 54. This guard portion overhangs the outer ends of the portions 44 and is shaped to fit the periphery of the cap 48, as is shown in Figure 3. This guard is somewhat arc-shaped and has inclined ends. Adjacent to the end of the guard toward which the seed are fed, I provide a wiper 58, having an inclined concave surface 59. As will be seen from reference to Figures 3, 4 and 5 the shape and location of this wiper are such that it projects towards the runway into the path of the moving seed, so that only a small clearance is left between such wiper and the portions 44'. As a result, any superfluous seed which are lodged partly within the pockets or cups are removed from such cups by the wiper and are caused to ride upwardly along the concave surface 59 onto the guard 53. The seed will then pass again into the bulk. This wiper is yieldably supported by securing the wiper 58 to the plate 60, located in the housing 61. The plate is held in engagement with the hopper by means of the spring 62 surrounding the bolt 63 secured to the plate 60 and held in position by means of the nut 64.

From the above description it will be understood that as the ground wheel rolls along, the sprocket chain 17 will drive the sprocket wheel 18 and the shaft 19, thus turning the gear wheels 30 and 31. These gear wheels engaging the teeth 32 and 34 on opposite sides of the center will cause the seed ring 38 and the cap 48 to revolve in opposite directions.

A series of teeth 22' extend upwardly from the flange 22 and serve to aid the breaking up of the bulk of seed contained in the hopper.

The rocking of the hopper to throw the planting mechanism out of gear is accomplished by the rocking of the hopper 10 in the pivot 15. In order to throw the mechanism into and out of gear, I provide the especially designed cam and dog devices shown in Figure 2. In order that the operator may conveniently shift the dog 70 so as to throw the machine into and out of gear, I provide a link 75 pivoted at one end to a pin 74 secured to the dog 70, and at the other end to a lever 76 pivoted at 77 to the frame of the machine. A forward push on this lever will throw the mechanism out of gear.

It will thus be seen that I have provided an improved seed ring having cups which operate in a more efficient manner than heretofore known, and one which insures the regular dropping of the seeds in the row.

I have described a preferred embodiment of my invention, and although specific terms are employed, they are used in a generic and descriptive sense and not for the purpose of limitation, the scope of the invention being set forth in the appended claims.

I claim:

1. In a planter, a hopper having a bottom plate formed with an annular runway, said runway having a discharge opening therethrough, a flat seed ring rotatably mounted in said runway, and having notches in its outer peripheral portion, and a cover integral with the ring having an approximately horizontally disposed lower surface and abutting over a portion of the notches.

2. In a planter, a hopper having a bottom formed with an annular runway, said runway having a vertical outer wall and an outwardly inclined wall extending upwardly therefrom, a flat seed ring rotatably mounted in said runway and having peripheral cups therein, the lower portion of said cups being deeper than the upper portions, and a cover for said cups, integral with the seed ring.

3. In a planter, a hopper having a bottom plate formed with an annular runway, and provided with a discharge opening adjacent said runway, a seed ring rotatably mounted in said runway, and having peripheral cups lying in the plane of the ring, a device integral with the said ring for limiting the quantity of seed carried by said cups to the discharge opening, said device comprising a lip extending over the upper portion of the cups.

4. A seed ring for planters having a plurality of cups in its outer peripheral portion, said cups becoming deeper as they progress around the periphery of the seed ring and having their wall portions slanted inward at the bottom, and a projection emanating from the upper side of the ring and covering a portion of the cup.

5. In a seed ring for planters, cups in the outer peripheral edge of the seed ring, the cups being deeper at their rear portion than at their forward portion, and having their walls slanted upwardly and outwardly, and a cover for the deeper portion of said cups projecting from the upper face of the seed ring.

6. An improved seed ring for planters comprising spaced cups in the periphery of the seed ring having spiral walls, and a cover portion for the base of said cups, said cover portion being integral with the seed ring.

7. In a seed ring for planters, a plurality of cups having spiral walls in the periphery of said ring, a cover for the cups, all of said parts being adapted to separate the seed from the bulk and to press the same away from the bulk into position to be dropped from the planter.

8. A seed ring for planters comprising means for separating a quantity of seed from the bulk prior to the dropping operation, said means comprising cups in the peripheral portion of the seed ring with covers for a portion of each cup.

9. A seed ring for planters comprising cups in the peripheral portion of the seed ring, wall portions for the cups, a cover for the cups, the wall portions having their initial portions at an angle to the radius of the seed ring, and having the remainder of the wall portions at a greater angle to the radius of the seed ring than the initial portions.

10. In a planter, a hopper, a seed ring, means for rotating the seed ring, an inclined outer surface on the seed ring forming a runway between the hopper and the seed ring, notches in the periphery of the seed ring, the wall of the said notches being inclined and approaching the center of the seed ring as extends towards the base of the notch, a cover for a portion of the notch, the inclined wall being adapted to force a selected portion of the seed away from the bulk, and the cover being adapted to finish the separation of the selected quantity of seed from the main bulk, to cause the selected quantity of seed to be dropped while unaffected by the bulk of seed in the hopper.

11. In a planter, a seed plate, notches in the seed plate, covers for the notches, and a lead in channel extending from the periphery of the seed ring from a point in front of the cups to the covered portions of the cups.

12. In a planter, a seed ring having curved notches in its periphery and lead-in channels running from a point on the periphery of the ring in front of the cups to the cups, said lead-in channels being adapted to separate a quantity of seeds from the main bulk and to force the seeds into the cups prior to the dropping operation.

13. A seed ring for planters comprising means for separating a quantity of seed from the main bulk prior to the dropping operation, said means comprising cups in the peripheral portion of the seed ring with covers for a portion of each cup, and a lead-in channel in the periphery of the seed ring at the forward end of each cup.

14. In a planter, a seed ring having cups in its outer peripheral portion, the walls of said notches beginning at the periphery of the ring and sloping inward to a predetermined point and then increasing the angularity of their slope, and a cover portion for the said notches, the upper surface of the cover portion being in the same plane as the upper surface of the seed ring and integral therewith, and the lower surface of the cover portion being in parallel relation with its upper surface.

15. A seed ring for planters having horizontally disposed upper and lower edges, the outer edge having its lower portion approximately vertically disposed, with the upper portion of the outer edge being bevelled, a plurality of cups in the outer edge of the seed ring, said cups having their wall portions cut deeper at their bottom portions than at their top portions, said wall portions being cut deeper as they progress towards the base of the cups, and an integral cover portion for the cups.

16. In a planter, a seed ring, a plurality of cavities in the outer peripheral portion of the seed ring, the primary portion of the wall of the cavities being cut at a predetermined angle to the periphery of the seed ring, and the remaining portion of the wall portion being cut at a greater angle with relation to the periphery than the primary portion, and a portion of the seed ring projecting over the remaining portion of the cavities.

In testimony whereof I have affixed my signature.

EUGENE M. COLE.